United States Patent
Klinski

(10) Patent No.: US 6,961,386 B2
(45) Date of Patent: Nov. 1, 2005

(54) DEVICE AND METHOD FOR INCREASING THE BANDWIDTH IN A LINE-CONNECTED MULTICARRIER SYSTEM

(75) Inventor: Robert Klinski, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 746 days.

(21) Appl. No.: 09/983,766

(22) Filed: Oct. 25, 2001

(65) Prior Publication Data

US 2002/0057738 A1    May 16, 2002

(30) Foreign Application Priority Data

Oct. 25, 2000 (DE) .................. 100 52 907

(51) Int. Cl.⁷ .................. H04K 1/10; H04L 27/28; H04B 1/66
(52) U.S. Cl. ...................... 375/260; 375/240
(58) Field of Search ................. 375/240, 241, 375/222, 260; 370/203, 208; 455/59, 60

(56) References Cited

U.S. PATENT DOCUMENTS

| | | | | |
|---|---|---|---|---|
| 5,061,925 A | * | 10/1991 | Sooch et al. | 341/120 |
| 5,301,167 A | * | 4/1994 | Proakis et al. | 367/134 |
| 5,909,463 A | * | 6/1999 | Johnson et al. | 375/220 |
| 6,226,322 B1 | * | 5/2001 | Mukherjee | 375/229 |
| 6,408,033 B1 | * | 6/2002 | Chow et al. | 375/260 |
| 6,445,730 B1 | * | 9/2002 | Greszczuk et al. | 375/219 |
| 6,480,475 B1 | * | 11/2002 | Modlin et al. | 370/294 |
| 6,535,565 B1 | * | 3/2003 | Girardeau et al. | 375/357 |
| 6,549,520 B1 | * | 4/2003 | Gross et al. | 370/242 |
| 6,597,745 B1 | * | 7/2003 | Dowling | 375/296 |
| 6,810,076 B1 | * | 10/2004 | Tang et al. | 375/219 |

FOREIGN PATENT DOCUMENTS

| DE | 691 06 503 T2 | 5/1995 |
|---|---|---|
| DE | 196 39 414 A1 | 4/1998 |
| DE | 197 01 011 C1 | 6/1998 |

* cited by examiner

Primary Examiner—Betsy L. Deppe
(74) Attorney, Agent, or Firm—Morrison & Foerster LLP

(57) ABSTRACT

The invention relates to a device and a method for increasing the bandwidth in a line-connected multicarrier system, the characteristic properties, estimated by a channel estimator of a transmission channel being interpolated/extrapolated by an interpolating/extrapolating device. An equalizer device performs additional equalization of affected carriers in dependence on these interpolated/extrapolated properties, a bit loading device being adapted in dependence on the additional equalization. In this manner, further carriers are available for the data transmission which increases a bandwidth.

9 Claims, 4 Drawing Sheets

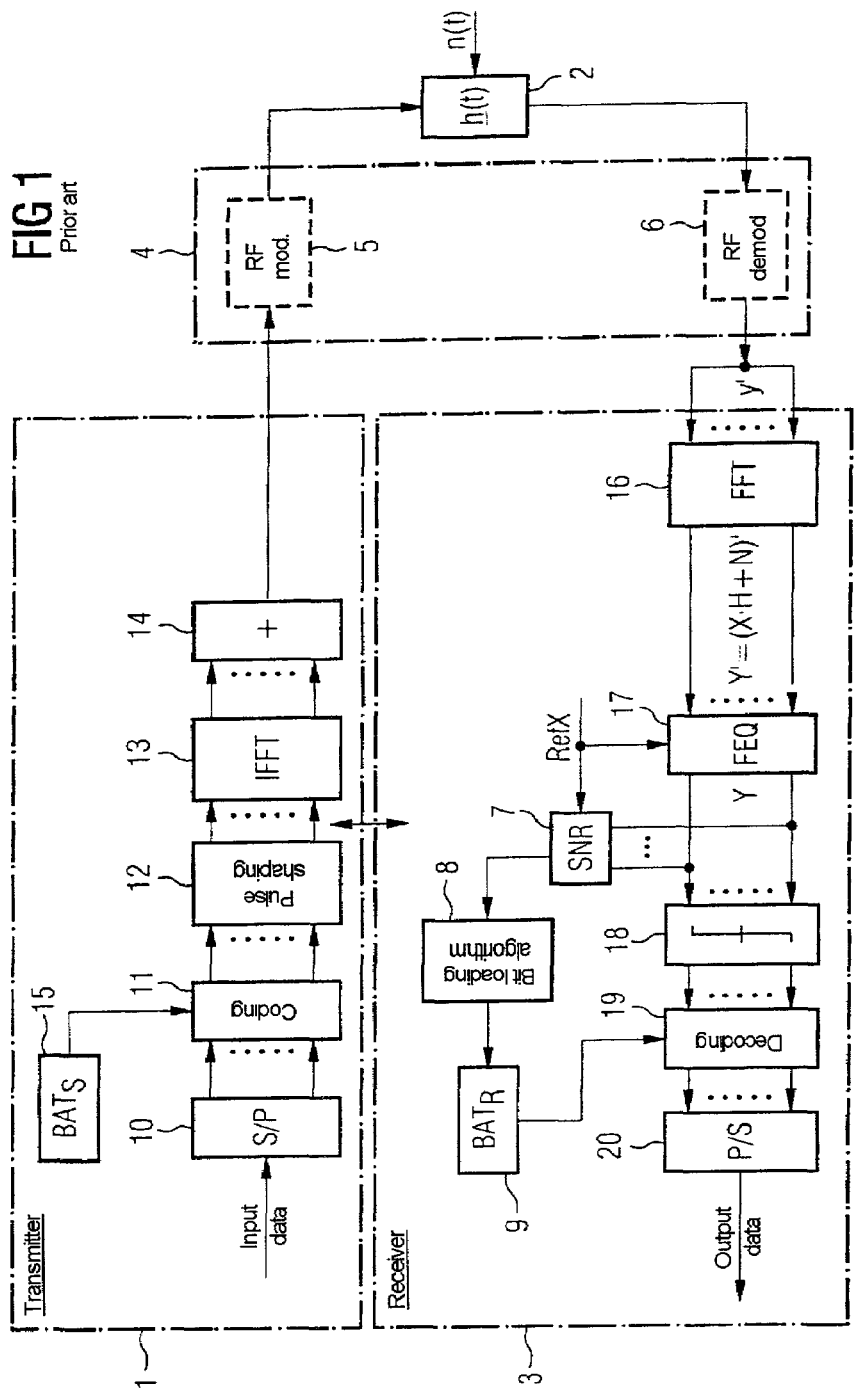

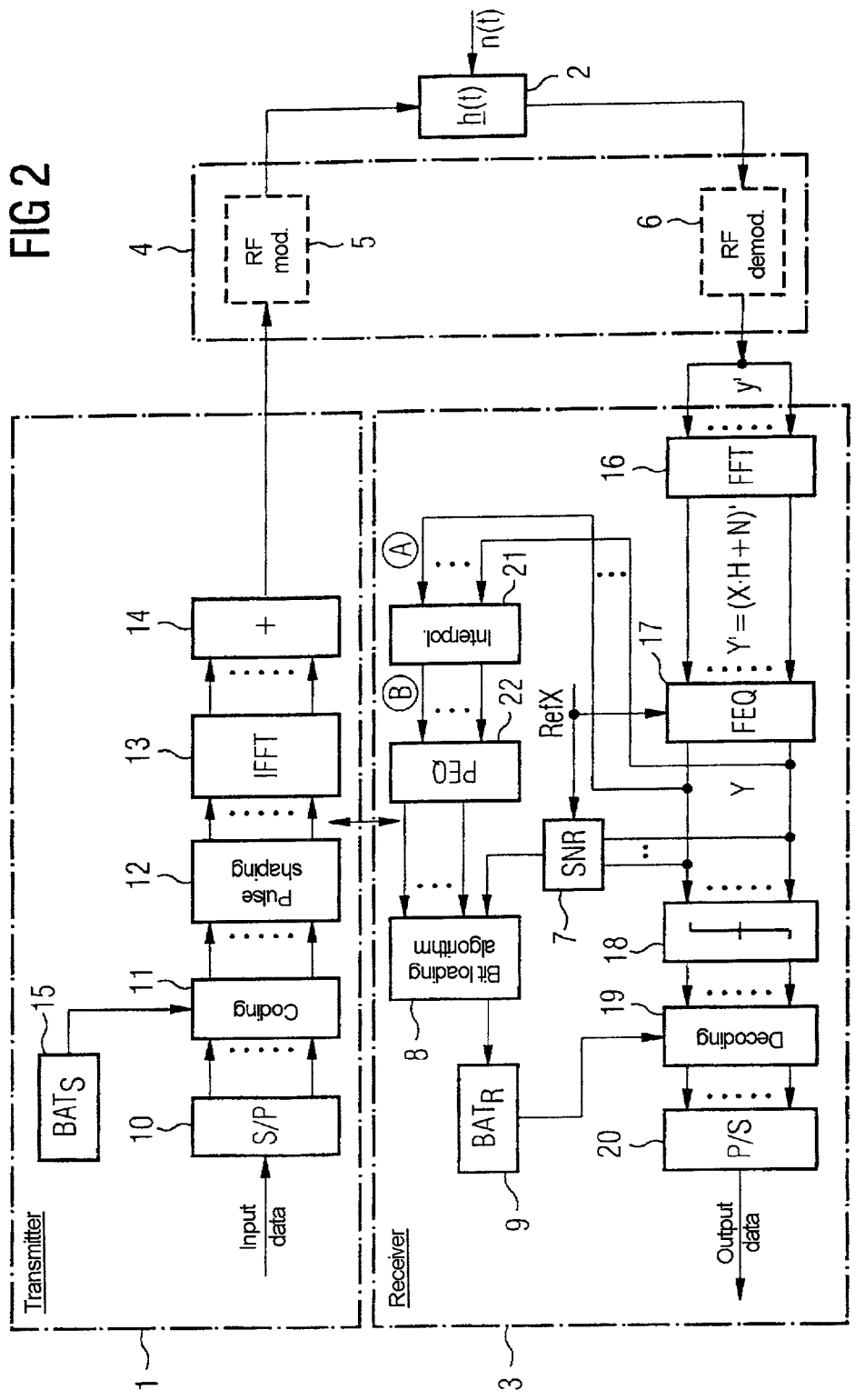

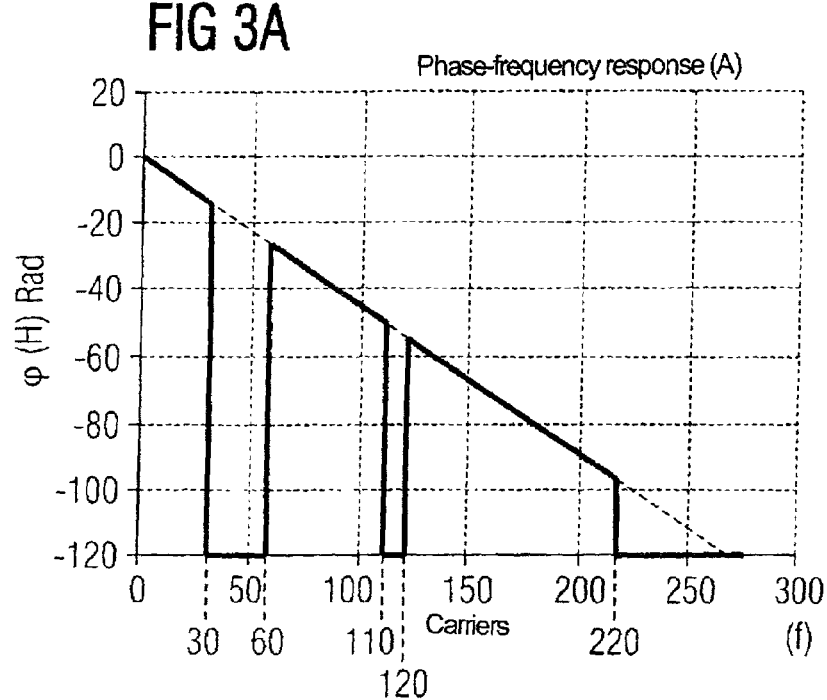
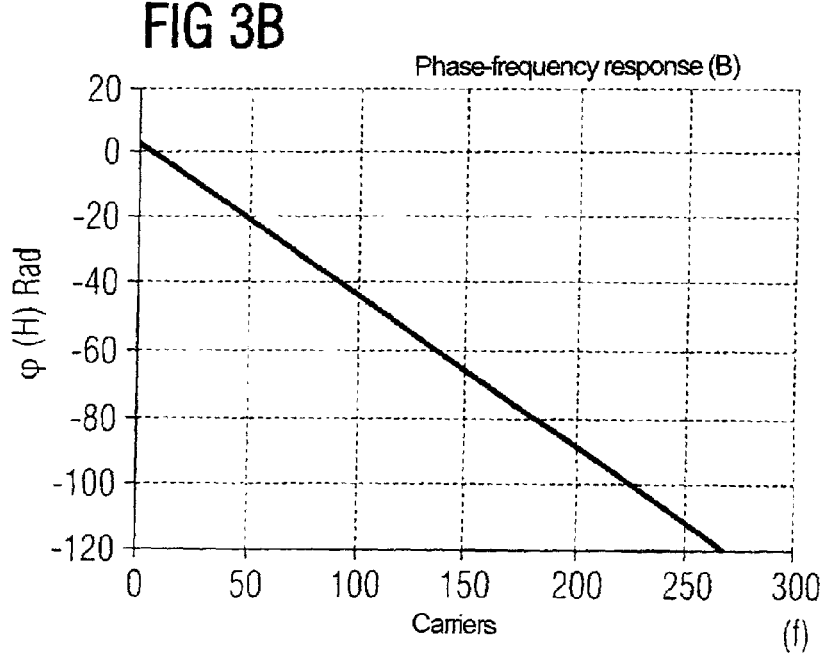

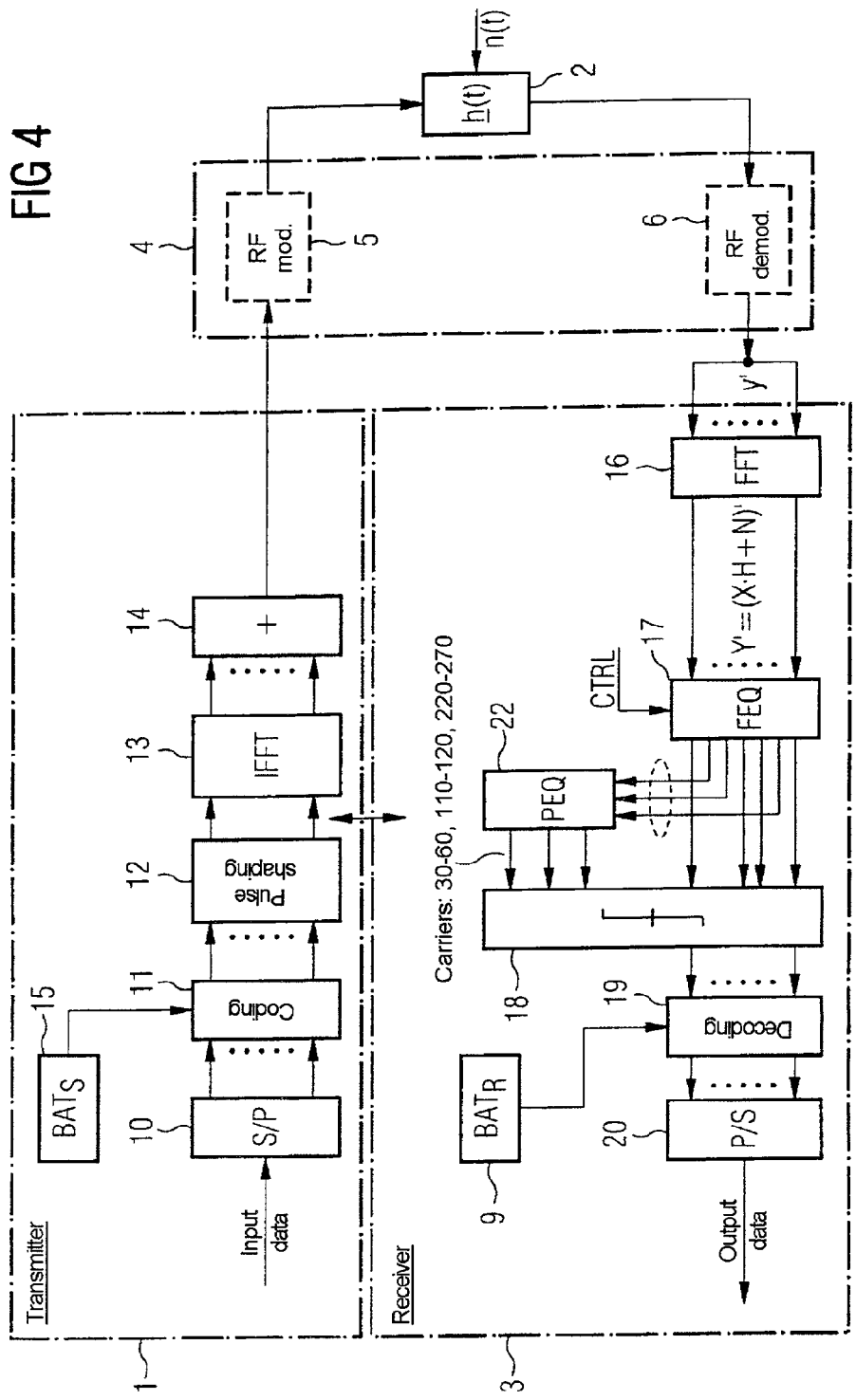

DEVICE AND METHOD FOR INCREASING THE BANDWIDTH IN A LINE-CONNECTED MULTICARRIER SYSTEM

CLAIM FOR PRIORITY

This application claims priority to Application No. DE 10052907.0 which was published in the German language on Oct. 25, 2000.

TECHNICAL FIELD OF THE INVENTION

The invention relates to a device and a method for increasing the bandwidth in a line-connected multicarrier system, and in particular, to a device and a method for increasing the bandwidth of xDSL transmission systems.

BACKGROUND OF THE INVENTION

Conventional digital multicarrier systems transmit and receive digital signals by using a multiplicity of carriers or, respectively, subchannels having different frequencies. In this arrangement, a transmitter divides a transmit signal into a multiplicity of components, assigns the components to a particular carrier, codes each carrier in accordance with its component and transmits each carrier via one or more transmission channels.

The maximum amount of information which can be coded on a particular carrier is a function of the signal to noise ratio (SNR) with respect to the carrier. However, the signal to noise ratio of a transmission channel can depend on frequency so that a maximum amount of information which can be coded on a carrier differs from carrier to carrier.

In this context, the so-called bit loading method provides for selective assignment of respective bits to carriers or subchannels dependent upon a signal to noise ratio prevailing on the carrier. A bit loading algorithm supplies the values for a so-called bit allocation table (BAT) which specifies an amount of information to be coded for a respective carrier or, respectively, assigns this amount to it.

FIG. 1 shows a simplified block diagram of a line-connected multicarrier system according to the prior art. The multicarrier system essentially consists of a transmitter 1, a transmission medium or channel 2 and a receiver 3. If a band pass system is implemented, an RF modulation system 4 with an RF modulator 5 and an RF demodulator can also be optionally used.

According to FIG. 1, a series of input data to be transmitted are first converted into a parallel datastream, for example in a serial/parallel converter 10. The parallel datastream is then coded by a coding stage 11 dependent upon a bit allocation table at the transmitting end. More precisely, each carrier is assigned a signal space constellation which is dependent on a prevailing signal to noise ratio and is determined, or respectively, optimized as bit allocation table by a bit loading algorithm during an initialization or training phase in the conventional multicarrier system. The signal thus coded (in the frequency domain) is then shaped into suitable transmission pulses in a pulse shaper 12 and changed into a time domain by a time domain modulator 13 which generates a multicarrier signal. The multicarrier signal is then combined by a summer 14.

At the receiver 3 which is constructed symmetrically with respect to the transmitter 1 according to FIG. 1, the subchannels or carriers of the received signal or, respectively, of the input data values y' are first separated, changed back into the frequency domain by a frequency domain modulator 16, supplied to a channel estimator 17 for estimating the characteristic properties of the transmission channel 2 and supplied to a decision stage 18 after a multiplicity of further processing stages, not shown. During the training phase, the decision stage input data values present in front of the decision stage 18 are derived and compared, for example by means of a noise variance determining device 7, with reference signals or reference data values RefX known at the receiving end, as a result of which a noise variance or noise power of the respective decision stage input data values Y is determined. In the same manner, these reference data values RefX are also supplied to the channel estimator 17 during an initialization phase as a result of which the characteristic properties such as, for example, a frequency response of the transmission channel 2 can be estimated. A bit allocation table 9 at the receiver end is written or adapted respectively, on the basis of this noise variance via a bit loading device 8 or, respectively, a bit loading algorithm executed therein. The bit allocation table 15 at the transmitting end is aligned with the bit allocation table 9 at the receiver end, for example via a return or control channel. The decision stage 18 is used for correlating the (inaccurate) decision stage input data value with an (exact) value of a predetermined set of values of a transmission format used (such as e.g. 4QAM). A subsequent decoding stage 19 then decodes the received data dependent upon the values of the bit allocation table 9 and a parallel/serial converter 20 converts the parallel datastream back into a serial output datastream.

In this manner, a bit allocation table optimized for a signal to noise ratio during the initialization phase or training phase is obtained which allows minimum bit error rates to be achieved for the output data (values). The disadvantageous factor in such a conventional multicarrier system is, however, the fact that this results in an unnecessary reduction in bandwidth. Conventional devices and methods for increasing a bandwidth in a line-connected multicarrier system have the disadvantage, however, that they are technically elaborate and thus expensive and require high computing power.

SUMMARY OF THE INVENTION

In one embodiment of the invention, there is a device for increasing the bandwidth in a line-connected multicarrier system, comprising a channel estimator to estimate characteristic properties of a transmission channel, a decision stage to correlate a decision stage input data value with a value of a predetermined set of values of a transmission format, a bit allocation table to specify an amount of information to be decoded/coded on a carrier of the multicarrier system, a bit loading device to change the bit allocation table, a noise variance determining device to drive the bit loading device based on a noise variance prevailing on the carriers, an interpolation/extrapolation device to interpolate/extrapolate the estimated characteristic properties of the transmission channel, and an equalizer device to perform additional equalization of carriers in dependence on the interpolated/extrapolated characteristic properties, the bit loading device being driven based on the additional equalization in the equalizer device.

In another aspect of the invention, the characteristic properties of the transmission channel represent a phase, the interpolation/extrapolation device represents a phase interpolator/extrapolator, and the equalizer device represents an additional phase equalizer.

In another aspect of the invention, the bit loading device is driven during one of an initialization phase and when a data transmission is in progress.

In yet another aspect of the invention, the multicarrier system represents an ADSL or UDSL system.

In another embodiment of the invention, there is a method for increasing the bandwidth in a line-connected multicarrier system, comprising estimating characteristic properties of a transmission channel, interpolating/extrapolating the estimated characteristic properties of the transmission channel for disturbed carriers, determining equalizer coefficients for disturbed carriers based on the interpolated/extrapolated characteristic properties, modifying a bit loading algorithm based on the equalizer coefficients, and performing the modified bit loading algorithm for specifying an amount of information to be decoded/coded on a carrier of the multicarrier system.

In another aspect of the invention, a phase of the transmission channel is estimated and interpolated/extrapolated.

In another aspect of the invention, the method is performed during an initialization phase.

In still another aspect of the invention, the method performs equalization of the characteristic properties of the disturbed carriers during a data transmission.

In another aspect of the invention, the method is performed in an ADSL or UDSL system.

BRIEF DESCRIPTION OF THE DRAWINGS

In the text which follows, the invention will be described in greater detail by means of an exemplary embodiment and referring to the drawing, in which:

FIG. 1 shows a simplified block diagram of a line-connected multicarrier system according to the prior art.

FIG. 2 shows a simplified block diagram of a line-connected multicarrier system with increased bandwidth during an initialization phase in the present invention.

FIGS. 3A and 3B show a phase-frequency response of a transmission channel before and after an interpolation/extrapolation according to the invention.

FIG. 4 shows a simplified block diagram of a line-connected multicarrier system with increased bandwidth when a data transmission is in progress.

DETAILED DESCRIPTION OF THE PREFERRED EMBODIMENTS

The invention discloses a device and a method for increasing the bandwidth in a line-connected multicarrier system which can be implemented in a simple and inexpensive manner.

An increase in bandwidth is obtained, particularly for the carriers previously disturbed in an extremely simple manner, by using an interpolation/extrapolation device for interpolating/extrapolating estimated characteristic properties of a line-connected transmission channel. An equalizer device is used for performing additional equalization of carriers dependent upon the interpolated/extrapolated characteristic properties, where a bit loading device is driven dependent upon the additional equalization.

The characteristic property of a line-connected transmission channel, which is estimated and interpolated/extrapolated, is preferably a phase since a phase-frequency response of a line-connected transmission channel can be generally differentiated monotonously and steadily, i.e. does not have any discontinuities. The phase-frequency response of the transmission channel can, therefore, be linearized piece by piece. This makes it extremely simple to implement the mathematical methods necessary for interpolation/extrapolation.

Furthermore, the bit loading device can be driven during an initialization or training phase. In principle, however, it is also possible to drive the bit loading device dynamically.

The present invention makes use of the fact that in a line-connected multicarrier transmission as takes place, e.g. in ADSL or UDSL systems, a bit allocation per carrier is determined during a training phase or initialization phase. Severely disturbed carriers are not used for the data transmission as soon as the associated bit error probability exceeds a predetermined threshold value (e.g. BE=$10^{-7}$ for ADSL). To provide equalization, the carrier is usually weighted with the inverse of the channel transfer function in the frequency domain. During the bit allocation and equalization, however, the special characteristics of line-connected transmission channels are taken into consideration to a limited extent. These special characteristics can now be used by the present invention.

In particular, a phase-frequency response of a line-connected transmission channel can be differentiated monotonously and steadily, i.e. has no discontinuities, and the phase-frequency response of the channel can be linearized piece by piece. Considering these particular properties, it is possible under certain conditions to use severely disturbed carriers additionally and thus to increase the effective bandwidth.

FIG. 2 shows a simplified block diagram of a line-connected multicarrier system with increased bandwidth during a training phase. Identical reference symbols designate identical elements as in FIG. 1.

According to FIG. 2, the line-connected multicarrier system with increased bandwidth includes a transmitter 1, a transmission channel 2 and a receiver 3. A band path system can be optionally implemented by means of an RF modulation system 4 with an RF modulator 5 and an RF demodulator 6. The line-connected multicarrier system according to FIG. 2 represents a further development of the multicarrier system shown in FIG. 1, modifications having been effected particularly in the receiver. However, the invention is not exclusively restricted to the multicarrier system as shown FIGS. 1 and 2, but can also be applied to any other line-connected multicarrier systems which are generally known as xDSL systems. Furthermore, the present invention can be used both at the exchange and at the subscriber end in the respective receiver.

The description below relates to a data transmission in one direction, and is intened to be exemplary. Data transmission can also be two way, or any other variation well known in the art.

According to FIG. 2, serial input data to be transmitted are initially converted into a parallel datastream in a serial/parallel converter 10, and then coded by a coding stage 11 dependent upon a bit allocation table 15 ($BAT_s$) at the transmitting end. The signal coded in this manner is then changed into suitable transmission pulses in a pulse shaper 12, and changed from a frequency domain into a time domain by a time domain modulator 13 which generates a multicarrier signal. For example, the time domain modulator 13 performs an inverse discrete fast Fourier transform (IFFT). The multicarrier signal is initially complex and a real signal is generated for the transmission which is combined by a summer 14. Transmission on the transmission channel 2 takes place for example on a conventional two-wire line.

At the receiver end, the received data signal with added noise signals n(t) or, respectively, the data input values y' is divided, changed back into the frequency domain by a frequency domain modulator 16, supplied to a channel estimator 17 and as decision stage input data value Y to a decision stage 18 after a multiplicity of further processing stages, not shown. In an initialization or training phase, the transmission characteristics H of the transmission channel 2 are estimated by the receive data values Y' or Y, and a reference data sequence RefX by the channel estimator or equalizer or a channel separation is performed and a noise variance SNR is determined by a noise variance determining device 7. In this process, convolution in the time domain of the transmit signal x(t) with the transmission characteristics h(t) of the transmission channel 2 in the frequency domain, and their corresponding values X and H are multiplied and a noise signal N is added. More precisely, this results in the receive signal in the frequency domain with Y'=(X*H+N)'.

The transmission channel can be described by $H(f)=|H(f)|e^{j\phi(f)}$ where $|H(f)|$ describes an absolute value and $\phi(f)$ describes a respective phase at a predetermined frequency of the transmission channel 2. After corresponding mathematical approximation and neglecting the noise effects, the following is obtained for the transmit signal $X \cong Y/H = |Y|e^{j\phi}_Y / |H|e^{j\phi}_H = |Y|/|H| * e^{j(\Phi-\phi)}_{YH}$.

Since the absolute value H becomes very small with severe channel attenuation, fundamental problems arise for the channel estimation due to the division. In addition, the absolute value of the channel transfer function can often be estimated with only insufficient accuracy in the case of severe disturbances. However, the phase is reflected as the difference in the exponent and can thus still be estimated or determined with sufficient accuracy in the case of very small absolute values. For this reason in particular, a phase-frequency response is preferably used for increasing a bandwidth in accordance with the present invention.

FIG. 3 shows, by way of example, a graphic representation of a phase-frequency response of a homogeneous two-wire line with a length of approximately 3 km, carriers 30 to 60, 110 to 120 and above 220 being severely disturbed and thus unusable due to noise signals. Since the phase response has been determined by means of the channel transfer function which has been estimated insufficiently, the phase of the received signal cannot be equalized on the basis of this information. This means that the carriers affected cannot be used for data transmission which entails a reduction of possible data rate.

The phase-frequency response of the line-connected transmission channel 2 can be differentiated monotonously and steadily, i.e. has no discontinuities and can thus be linearized piece by piece. According to FIG. 2, the channel coefficients estimated after the channel estimator or frequency domain equalizer (FEQ) 17 are accordingly supplied to an interpolation/extrapolation device 21 which performs an interpolation/extrapolation of the estimated channel coefficients or respectively, of the phase-frequency response of the transmission channel 2. To implement this interpolation and extrapolation, a multiplicity of methods are conceivable and, for example, linear functions, spline functions etc. are conceivable. On the basis of the special properties of the transmission channel 2, the characteristic properties such as, for example, the phase of severely disturbed carriers (30 to 60, 110 to 120, 220 to 270) can be determined in approximation, the result of which may be that, in principle, these carriers can be used for data transmission.

According to FIG. 2, the transmission channel 2 is estimated by the reference sequence RefX during an initialization or training phase and supplied to the interpolation/extrapolation device 21, for example, as channel coefficients.

FIG. 3B shows a graphic representation of a phase-frequency response after such an interpolation/extrapolation which, according to the present invention, makes it possible to use the carriers which were initially disturbed. An additional equalization of the carriers affected now takes place in an equalizer device 22 dependent upon the interpolated/extrapolated characteristic properties or phase, respectively, of the transmission channel 2, a subsequent bit loading device 8 being additionally driven in dependence on the additional equalization in the equalizer device 22. More precisely, the equalizer device 22 can be conditioned with this additional information during which process the necessary coefficients are set and additional equalization is carried out in the frequency domain. Due to the advantages in using a phase-frequency response of the transmission channel 2, described above, the equalizer device 22 preferably consists of a phase domain equalizer (PEQ).

Furthermore, according to FIG. 2, a signal to noise ratio or noise variance, respectively, which is prevailing during the training phase, is determined in the usual manner by a noise variance determining device 7 dependent upon the known reference data sequence RefX, and also supplied to the bit loading device 8 which again determines the basic signal space constellation per carrier. Due to the additional equalization of carriers which were not usable originally, they can be occupied again with information or bits wholly or at least partially. According to the invention, the effective bandwidth of the line-connected multicarrier system is increased by means of additional interpolation and extrapolation of characteristic properties and equalization.

The other blocks illustrated in the diagram essentially operate similar to the blocks according to FIG. 1. More precisely, a bit allocation table 9 ($BAT_R$) at the receiver end is set via the bit loading device 8 in such a manner that minimum bit error rates are produced on the respective carriers. For this purpose, a subsequent decoding stage 19 decodes the received data based on the values of the bit allocation table 9, a parallel/serial converter 20 converting the parallel datastream back into a serial datastream. The bit allocation tables 9 and 15 at the transmitter and receiver end respectively, are adapted or matched, respectively, via a separate return channel. In this manner, additional carriers can be used for the data transmission which allows an effective bandwidth to be increased.

FIG. 4 shows a simplified block diagram of a line-connected multicarrier system with increased bandwidth when a data transmission is in progress (show time). Identical reference symbols designate identical elements.

After the completion of the initialization or training phase shown in FIG. 2, the actual data transmission takes place. Since the coefficients of the equalizer device 22 or phase domain equalizer are determined after conclusion of the initialization or training phase, the carriers discarded due to disturbances are additionally equalized by the phase domain equalizer. This equalization takes place in the frequency domain and means an additional phase rotation of the received symbols or data values when using a phase as characteristic property. There is thus no absolute-value equalization. According to FIG. 4, the disturbed and discarded carriers are additionally equalized by the equalizer device 22 during a data transmission and are again supplied to the decision stage 18 for allocating predetermined values from a predetermined set of values of a transmission format used. In addition, the device 22 can be arranged in front of the device 17.

According to the exemplary embodiment described above, the bit loading device 8 is driven during an initialization or training phase. However, it can also be driven when a data transmission is in progress as a result of which so-called dynamic bit allocation methods can be implemented. Furthermore, the present invention has been described in particular by using a phase-frequency response. However, other characteristic properties of the transmission channel 2 can also be used such as, for example, an absolute value. Accordingly, using the present invention, a characteristic property of severely disturbed carriers can be determined in approximation and interpolated/extrapolated as a result of which these carriers can be used again for transmitting information. Since usually time-variant noise power densities prevail during a training phase, the transmission channel can be determined or estimated with sufficient accuracy in the case of carriers having a small signal to noise ratio (SNR). Due to the interpolation/extrapolation according to the invention, however, a significantly more accurate equalization of the transmission channel becomes possible and additional carrier allocation and thus increase of a bandwidth can be ensured with sufficiently accurate phase correction.

What is claimed is:

1. A device for increasing the bandwidth in a line-connected multicarrier system, comprising:
    a channel estimator to estimate characteristic properties of a transmission channel;
    a decision stage to correlate a decision stage input data value with a value of a predetermined set of values of a transmission format;
    a bit allocation table to specify an amount of information to be decoded/coded on a carrier of the multicarrier system;
    a bit loading device to change the bit allocation table;
    a noise variance determining device to drive the bit loading device based on a noise variance prevailing on the carriers;
    an interpolation/extrapolation device to interpolate/extrapolate the estimated characteristic properties of the transmission channel; and
    an equalizer device to perform additional equalization of carriers in dependence on the interpolated/extrapolated characteristic properties, the bit loading device being driven based on the additional equalization in the equalizer device.

2. The device as claimed in claim 1, wherein the characteristic properties of the transmission channel represent a phase, the interpolation/extrapolation device represents a phase interpolator/extrapolator, and the equalizer device represents an additional phase equalizer.

3. The device as claimed in claim 1, wherein the bit loading device is driven during one of an initialization phase and when a data transmission is in progress.

4. The device as claimed in claim 1, wherein the multicarrier system represents an ADSL or UDSL system.

5. A method for increasing the bandwidth in a line-connected multicarrier system, comprising:
    estimating characteristic properties of a transmission channel;
    interpolating/extrapolating the estimated characteristic properties of the transmission channel for disturbed carriers;
    determining equalizer coefficients for disturbed carriers based on the interpolated/extrapolated characteristic properties;
    modifying a bit loading algorithm based on the equalizer coefficients; and
    performing the modified bit loading algorithm for specifying an amount of information to be decoded/coded on a carrier of the multicarrier system.

6. The method as claimed in claim 5, wherein a phase of the transmission channel is estimated and interpolated/extrapolated.

7. The method as claimed in claim 5, wherein the method is performed during an initialization phase.

8. The method as claimed in claim 5, further comprising performing equalization of the characteristic properties of the disturbed carriers during a data transmission.

9. The method as claimed in claim 5, wherein the method is performed in an ADSL or UDSL system.

* * * * *